(12) United States Patent
Christopher

(10) Patent No.: US 11,092,761 B2
(45) Date of Patent: Aug. 17, 2021

(54) DOWNHOLE FIBER OPTIC CONNECTOR WITH FIBER CHANNEL INDEPENDENT TESTING APPARATUS

(71) Applicant: Scott Christopher, Houston, TX (US)

(72) Inventor: Scott Christopher, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/703,212

(22) Filed: Dec. 4, 2019

(65) Prior Publication Data

US 2021/0173149 A1 Jun. 10, 2021

(51) Int. Cl.
*G02B 6/38* (2006.01)
*E21B 47/135* (2012.01)

(52) U.S. Cl.
CPC .......... *G02B 6/3895* (2013.01); *E21B 47/135* (2020.05)

(58) Field of Classification Search
None
See application file for complete search history.

(56) References Cited

U.S. PATENT DOCUMENTS

| | | | |
|---|---|---|---|
| 5,345,520 A | 9/1994 | Grile | |
| 5,845,023 A * | 12/1998 | Lee | G02B 6/2848 385/33 |
| 6,733,186 B2 | 5/2004 | Pfleger | |
| 7,497,723 B2 | 3/2009 | Brassell et al. | |
| 8,556,651 B1 | 10/2013 | Heitmann et al. | |
| 9,002,198 B2 * | 4/2015 | Ikushima | H04B 10/07 398/16 |
| 10,693,555 B2 * | 6/2020 | Parkin | H04B 10/0773 |
| 2003/0016916 A1 | 1/2003 | Allen et al. | |
| 2008/0078556 A1 | 4/2008 | Stoesz et al. | |
| 2011/0170116 A1 | 7/2011 | Homa et al. | |
| 2012/0176250 A1 * | 7/2012 | Duncan | G01V 11/002 340/853.2 |
| 2012/0328304 A1 * | 12/2012 | Ikushima | H04B 10/2589 398/140 |
| 2017/0139147 A1 | 5/2017 | Baaijens et al. | |
| 2018/0109048 A1 | 4/2018 | Dykas et al. | |

(Continued)

OTHER PUBLICATIONS

Ideal Industries, Inc.; "Fiber Optic Visual Fault Finder"; Sycamore, IL, 2005; Specification Sheets; 2 Pages.

(Continued)

*Primary Examiner* — Michelle R Connelly
(74) *Attorney, Agent, or Firm* — Cantor Colburn LLP

(57) ABSTRACT

A system and method of forming an optical connection. A fiber optic cable includes a first optical fiber and a second optical fiber. The second optical fiber includes a reflective device. An optical device receives the first optical fiber and the second optical fiber. A first signal is observed to verify an optical connection between the first optical fiber and the optical device to verity the optical connection. The fiber optic cable is extended into the optical device to form a secure mating between the first optical fiber and the optical device, thereby changing a state of the reflective device. The secure mating between the first optical fiber and the optical device is determined from the state of the second signal in the second optical fiber.

15 Claims, 8 Drawing Sheets

(56) References Cited

U.S. PATENT DOCUMENTS

2019/0072733 A1    3/2019    Ramasubramanian

OTHER PUBLICATIONS

Corning Lanscape Solutions; "Field-Installable Fiber Optic Connector Tool Kits"; A LANscape Solutions Product; LANscape Solutions; Corning Cable Systems, LLC; Specification Sheet LAN-306-EN; Nov. 2012; Hickory, NC, 8 Pages.
International Search Report and Written Opinion for International Application No. PCT/US2020/062123; International Filing Date Nov. 25, 2020; dated Mar. 22, 2021; 7 Pages.

* cited by examiner

DOWNHOLE FIBER OPTIC CONNECTOR WITH FIBER CHANNEL INDEPENDENT TESTING APPARATUS

BACKGROUND

In the resource recovery industry, fiber optic cables are used in downhole operations such as wellbore completions in order to transmit data between the surface and a downhole location. Downhole assembly of a fiber optic connection includes extending the fiber optic cable to an optical coupler at a downhole location and coupling the fiber optic cable to the optical coupler at the downhole location. Visual confirmation of this couple requires withdrawing the equipment from the wellbore, which is timely and costly. Therefore, there is a need for confirming a secure coupling between an optical fiber and an optical connector at the downhole location.

SUMMARY

A method of forming an optical connection with a first optical fiber; propagating a first signal in a first optical fiber of a fiber optic cable and a second signal in a second optical fiber of the fiber optic cable, the second optical fiber including a reflective device; mating the first optical fiber and the second optical fiber to an optical device; observing, at a processor, the first signal to verify an optical connection between the first optical fiber and the optical device; extending the fiber optic cable into the optical device to form a secure mating between the first optical fiber and the optical device, wherein extending the fiber optical cable changes a state of the reflective device of the second optical fiber when the secure mating is formed; and determining, at the processor, the secure mating between the first optical fiber and the optical device from the state of the second signal in the second optical fiber.

A system for optical coupling, including a fiber optic cable including a first optical fiber and a second optical fiber, the second optical fiber including a reflective device; an optical device receptive to the first optical fiber and second optical fiber wherein a loose mating between the first optical fiber and the optical device allows an optical connection for a first signal and a secure mating between the first optical fiber and the optical device coincides with a change in a state of the reflective device; and a processor configured to measure the first signal in the first optical fiber to verify the optical connection between the first optical fiber and the optical device and to measure a state of the second signal in the second optical fiber to measure a state of the second signal in the second optical fiber to determine a security of the mating between the first optical fiber and the optical device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
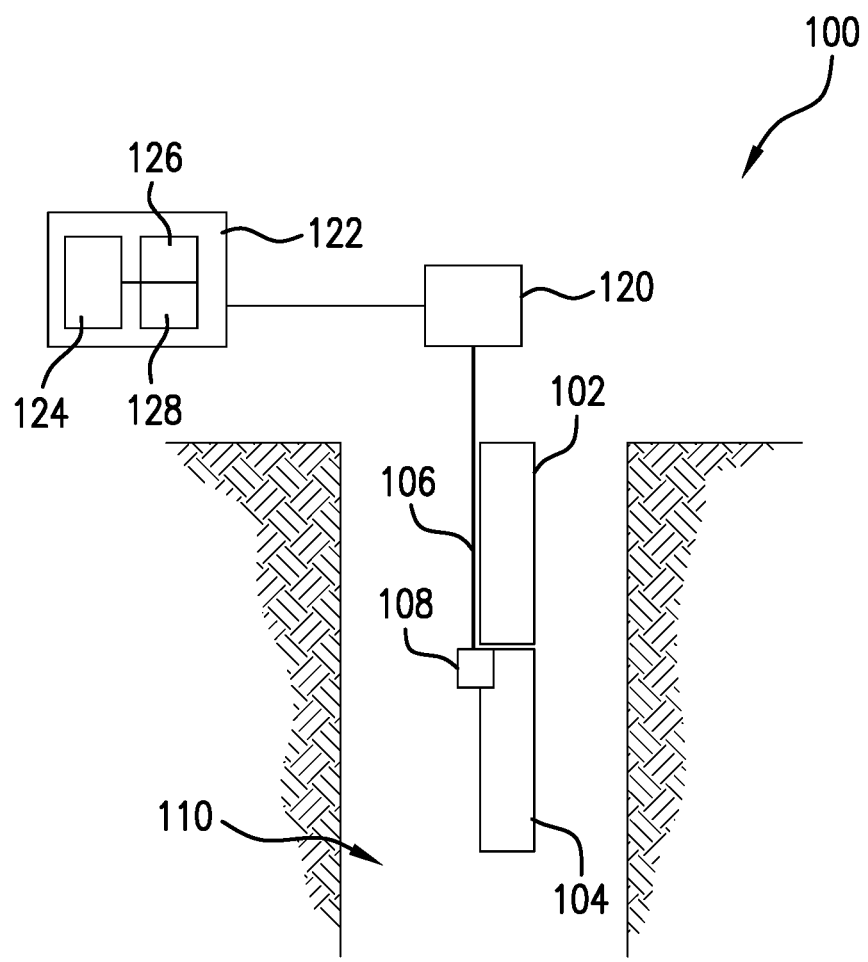
FIG. 1 shows a section of a wellbore completion including an optical communication link.

Referring to FIG. 1, a section of a wellbore completion 100 is shown in an embodiment of the invention. The wellbore completion 100 includes a first tubular 102 and a second tubular 104 in a wellbore 110. In various embodiments, the first tubular 102 is lowered onto the second tubular 104 in order to mate the first tubular 102 to the second tubular 104. The first tubular 102 includes an fiber optic cable 106. The second tubular 104 includes an optical coupler 108. The fiber optic cable 106 couples or mates to the optical coupler 108 when the first tubular 102 is lowered onto the second tubular 104. At the second tubular 104, the optical coupler 108 can be an optical device or can be coupled to another optical device (not shown), such as another fiber optic cable, other optical communication device, etc. In other embodiments, the fiber optic cable 106 can be disposed on the second tubular 104 while the optical coupler 108 is disposed on the first tubular 102. In various embodiments, the fiber optic cable 106 can be lowered downhole independently for the first tubular 102.

The wellbore completion 100 further includes an optical interrogator 120 and a control unit 122 for operating the optical interrogator, among other things. The control unit 122 includes a processor 124 and a memory storage device 126 that includes various programs 128 that, when accessed by the processor 124, control the operation of the processor 124 to perform various operations at the wellbore completion 100 such as to determine the security of the coupling mating between the fiber optic cable 106 and the optical coupler 108. The processor 124 can further perform various operations based on determining that the mating is secured.

An optical interrogator 120 propagates a diagnostic signal, such as a laser light, downhole along the fiber optic cable 106 in order to determine a parameter at a downhole location. In various embodiments, a reflection of the diagnostic signal (as referred to herein as a "reflected signal") from a downhole element propagates uphole via the fiber optic cable 106 or other optical link back to the optical interrogator 120. The optical interrogator 120 can communicate the diagnostic signal and the reflected signal to the processor 124. The processor 124 can determine the downhole parameter from a difference between the diagnostic signal and the reflected signal.

Figure 2A:
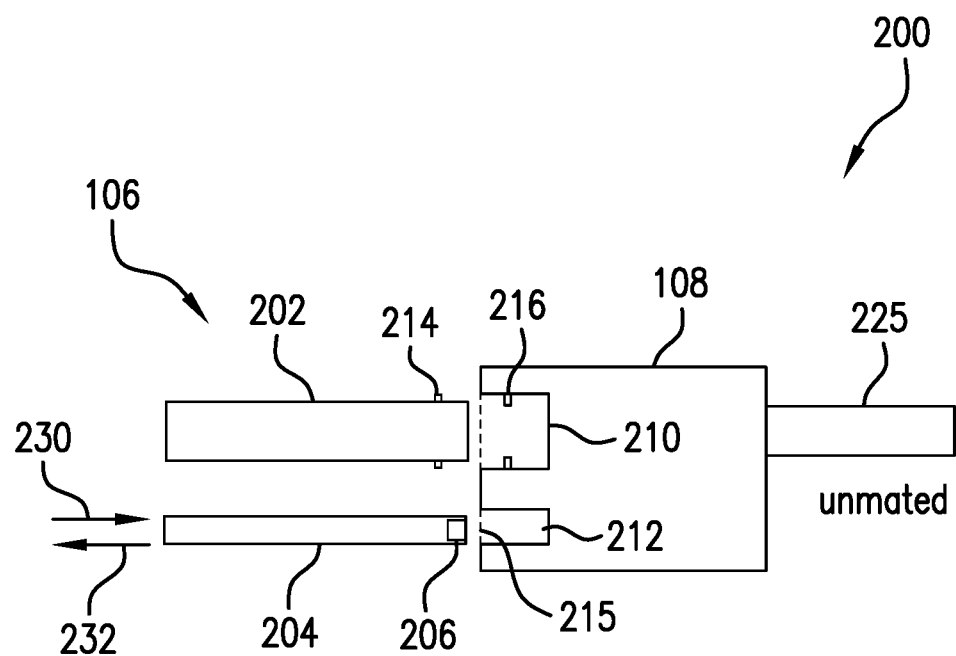
FIGS. 2A-C show an illustrative optical connection system in various mated states.
Figure 2B:
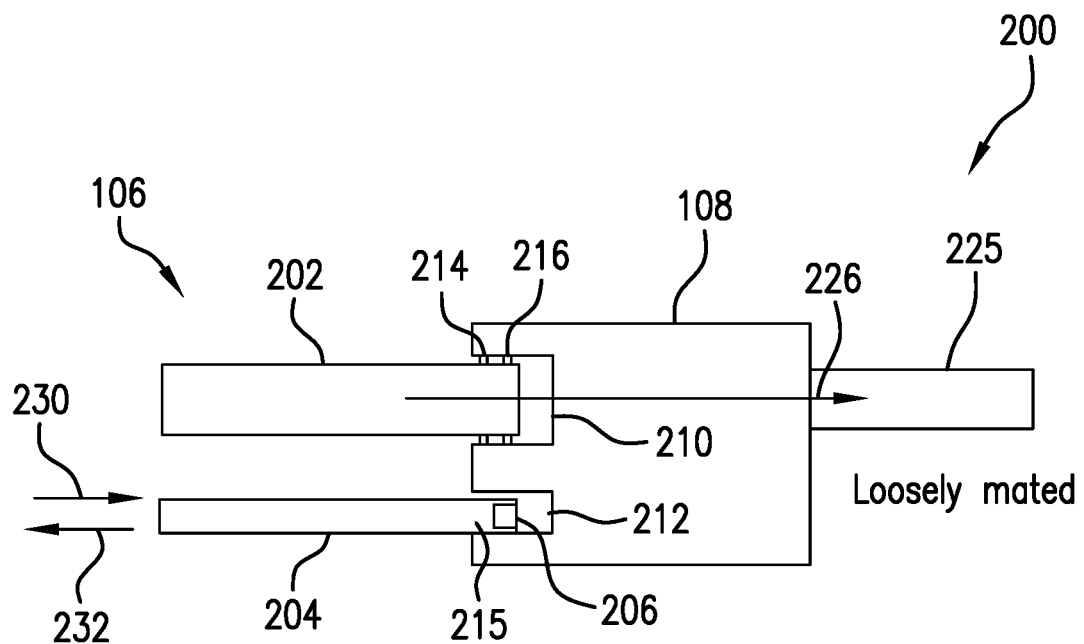
Figure 2C:
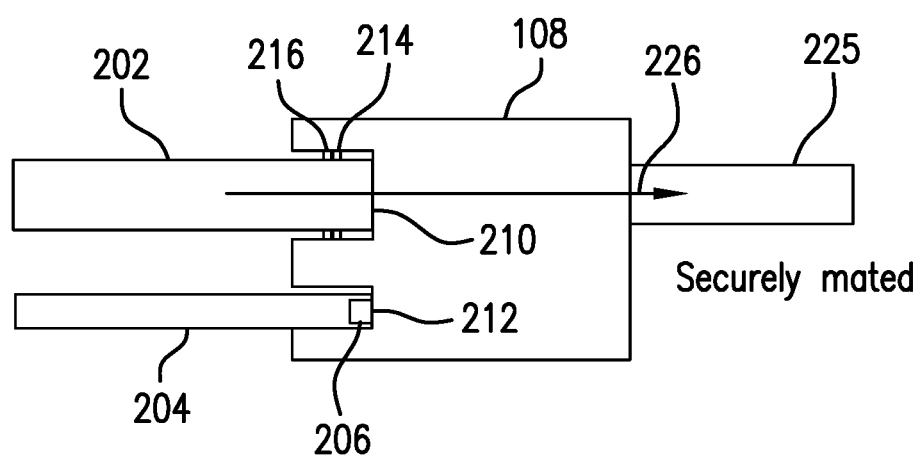

FIGS. 2A-2C shows an illustrative optical connection system 200 in an embodiment of the present invention. The optical connection system 200 shows the fiber optic cable 106 and the optical coupler 108 in various mated states. The fiber optic cable 106 includes a first optical fiber 202 that is an operative optical fiber and a second optical fiber 204 that can be a diagnostic fiber used for diagnosing or determining a security of a connection between the first optical fiber 202 and the optical coupler 108. For illustrative purposes, a third optical fiber 225 is shown mated to the optical coupler 108.

In various embodiments, the second optical fiber 204 includes an associated reflective device 206 that changes its state when the second optical fiber 204 interacts with, comes into contact with, or presses against the optical coupler 108. Since a mechanical interaction of the second optical fiber 204 with the optical coupler 108 coincides with a secure mating of the first optical fiber 202, observing the change in the state of the reflective device in the second fiber 204 gives an indication of the mated state of the first optical fiber 204. Alternatively, the second receptacle 212 can have a reflective device that changes its state when the second optical fiber 204 interacts with the second receptacle 212.

In the embodiment shown in FIGS. 2A-2C, the second optical fiber 204 includes a hermetic seal 215. The hermetic seal 215 is broken by the second optical fiber 204 in order to change from an unmated stated to a loosely mated state with the second receptacle 212. In various embodiments, the second optical fiber 204 can also be used to act as a pressure and/or temperature gauge before and/or after the connection has been made. Additionally, the second optical fiber 204 can be used to determine a security of a connection other connections, such as a electrical, hydraulic, optical, etc.

FIG. 2A shows the fiber optic cable 106 and the optical coupler 108 in an unmated state. The optical coupler 108 includes a first receptacle 210 for receiving the first optical fiber 202 and a second receptacle 212 for receiving the second optical fiber 204. The first optical fiber 202 is shown having an outer ridge 214 on its outer diameter at its mating end. The first receptacle 210 of the optical coupler 108 is shown having an inner ridge 216 on its inner diameter surface. The first optical fiber 203 becomes securely mated to the optical coupler 108 when the outer ridge 214 of the first optical fiber 202 passes beyond the inner ridge 216 of the first receptacle 210, as shown in FIG. 2C. Although not shown, such ridges can also be used for the second optical fiber 204 and the second receptacle 212. Other devices for securely mating the optical fibers to their respective receptacles can be used in alternate embodiments.

FIG. 2B shows the fiber optic cable 106 and the optical coupler 108 in a loosely mated state. The first optical fiber 202 and second optical fiber 204 are not fully engaged within their respective receptacles. For example, the outer ridge 214 of the first optical fiber 202 has not passed beyond the inner ridge 216 of the first receptacle 210. However, when the first optical fiber 202 is loosely mated to the optical coupler 108, a communication signal 226 is able to pass from the first optical fiber 202 to the third optical fiber 225. In various embodiments, the second optical fiber 204 is approximately the same length as the first optical fiber 202 and runs alongside of the first optical fiber 202. The first optical fiber 202 therefore become securely mated to the optical coupler 108 simultaneously or substantially simultaneously with the second optical fiber 204 becomes securely mated or with a change in a state of the reflective device 206 of the second optical fiber 204. In one embodiment, the first optical fiber 202 and second optical fiber 204 are arranged such that loosely mating the first optical fiber 202 to the optical coupler 108 forms a communication pathway with the optical coupler 108 as the second optical fiber 204 is almost at a position to change a state of the reflective device 206. Extending the first optical fiber 202 into the optical coupler 108 to from a secure connection simultaneously changes the state of the reflective device 206 of the second optical fiber 204. A diagnostic signal transmitted in the second optical fiber 204 to the optical coupler 108 is generally reflected off of a reflective device 206 at the mating end of the second optical fiber 204 and travels back up the second optical fiber 204 to be read at the optical interrogator 120, as long as the second optical fiber 204 is in a reflective state, as in FIG. 2B.

FIG. 2C shows a securely mated stated of the fiber optic cable 106 with the optical coupler 108. Pushing the loosely mated fiber optic cable 106 into the optical coupler 108 forms a secure mating between the first optical fiber 202 and the optical coupler 108 simultaneous with changing the state of the reflective device 206 in the second optical fiber 204 Therefore, measuring the diagnostic signal (along with measuring the communication signal 226) provides information about the security of the connection or mating of the first optical fiber 202 with the optical coupler 108. In various embodiments, the first optical fiber 202 can be a plurality of optical fibers. The first optical fiber 202 and second optical fiber 204 can be mechanically connected via tape, plastic molding, conduits, etc.

The diagnostic signal in the second optical fiber 204 changes its state when the first optical fiber 202 is securely mated to the first receptacle 210. In particular, the first optical fiber 202 and the second optical fiber 204 are arranged such that the diagnostic signal propagating in the second optical fiber 204 changes from a first state to a second state when the first optical fiber 202 changes from being loosely mated to being securely mated with the first receptacle 210. In various embodiments, the first state can be a reflected signal at a first wavelength, while the second state is a reflected signal at a second wavelength. In other embodiments, the first state can be a present reflected signal while the second state is a null reflected signal. Therefore, a diagnostic test can be run on the second optical fiber 204 in order to determine whether the first optical fiber 202 is loosely mated or securely mated.

When the first optical fiber 202 is loosely mated to the optical coupler 108, the passage of the communication signal 226 can be detected. To obtain an indication of a security of the mating between the first optical fiber 202 and the first receptacle 210, the optical interrogator 120, propagates a diagnostic signal 230 along the second optical fiber 204 and observes a whether or not there is a reflected signal 232 for the diagnostic signal. In particular, the optical interrogator 120 monitors the reflected signal 232 propagating in the second optical fiber 204 to observe when the reflected signal 232 changes from a first state to a second state to determine that the first optical fiber 202 is securely mated within the first receptacle 210. The processor 124 determines from signals from the optical interrogator 120 that the first optical fiber 202 is securely mated to the first receptacle 210 from observing the state of the reflected signal 232. The processor 124 can then perform an operation based on the first optical fiber 202 being in a securely mated state. For example, the processor 124 can instruct the optical interrogator 120 to send a signal along the first optical fiber 202 in order to perform downhole tests, operate downhole devices, etc. FIGS. 3-6 show various mechanisms by which the state of the reflected signal 232 and thus the securely mated state of the first optical fiber 202 can be determined.

Figure 3:
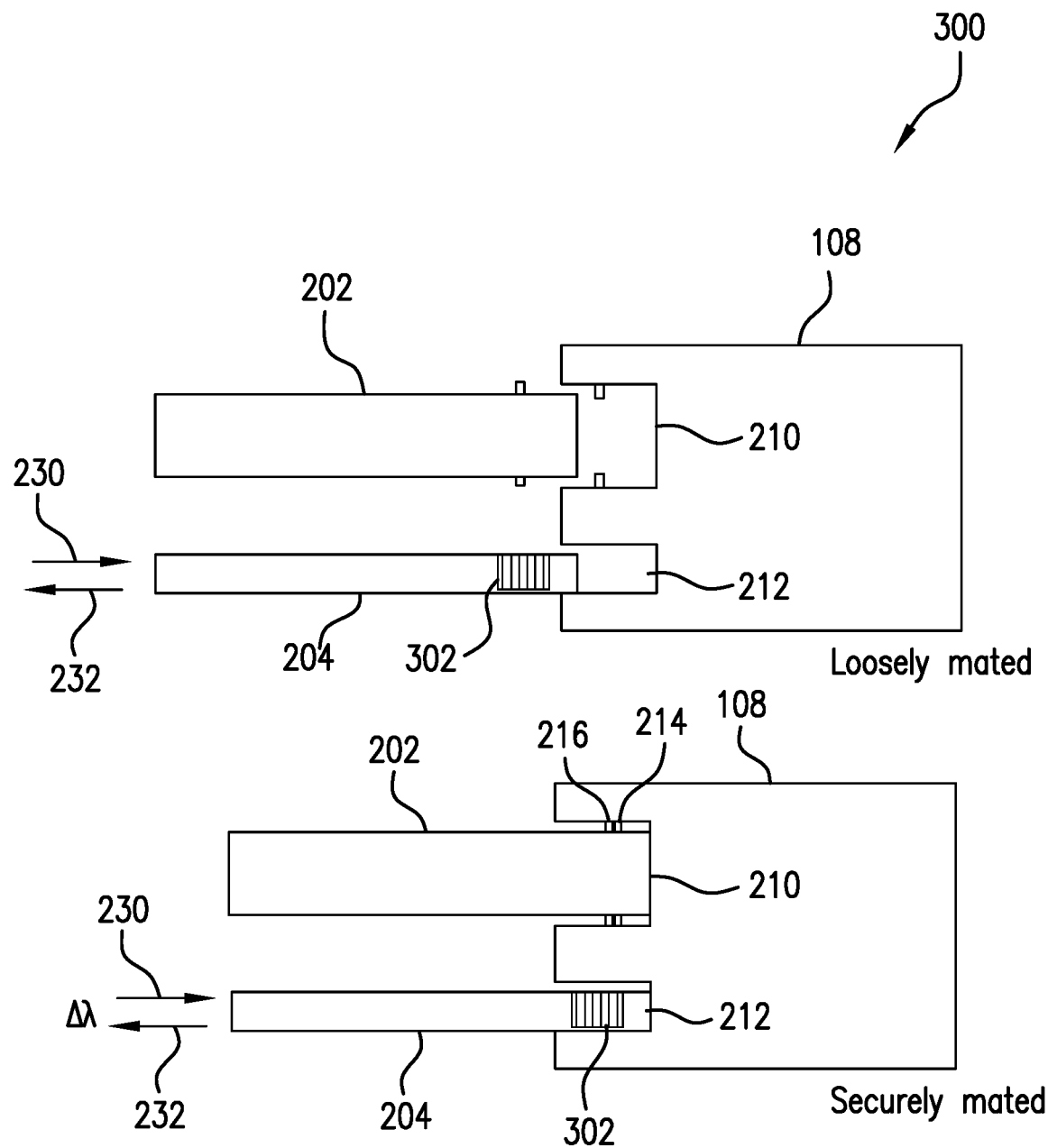
FIG. 3 shows an optical connection system using a strain sensor to determine a mated state of an optical fiber.

FIG. 3 shows an optical connection system 300 using a strain sensor 302 on the second optical fiber 204 to determine a security of the mated state of the first optical fiber 202. The strain sensor 302 is located at a mating end of the second optical fiber 204. In an illustrative embodiment, the strain sensor 302 includes a Fiber Bragg grating (FBG). An FBG includes periodically-spaced regions having an index of refraction different from the rest of the second optical fiber 204. The wavelength of light reflected by the FBG is related to the distance between these regions. As the second optical fiber 204 is inserted into the second receptacle 212, a strain is applied to the FBG, causing the reflected signal 232 to change from having a first wavelength (corresponding to an unstressed fiber) to having a second wavelength (corresponding to a stressed fiber).

To determine the security of the mating between the first optical fiber 202 and the first receptacle 210, a diagnostic signal 230 is propagated along the second optical fiber 204 from the optical interrogator 120 during the mating process. The strain sensor 302 reflects the diagnostic signal 230 as the reflected signal 232. As the first optical fiber 202 securely mates with the first receptacle 210, the second optical fiber 204 presses against the second receptacle 212 to place a strain on the strain sensor 302, causing a change in a wavelength of the reflected signal 232. The optical interrogator 120 measures the change in the wavelength of the reflected signal 232 due to the stress applied on the strain sensor 302 when the second optical fiber 204 presses against the second receptacle 212 and provides the measured change to the processor 124. The processor 124 can then determine from the change in the wavelength that the first optical fiber 202 is securely mated to the first receptacle 210.

Figure 4:
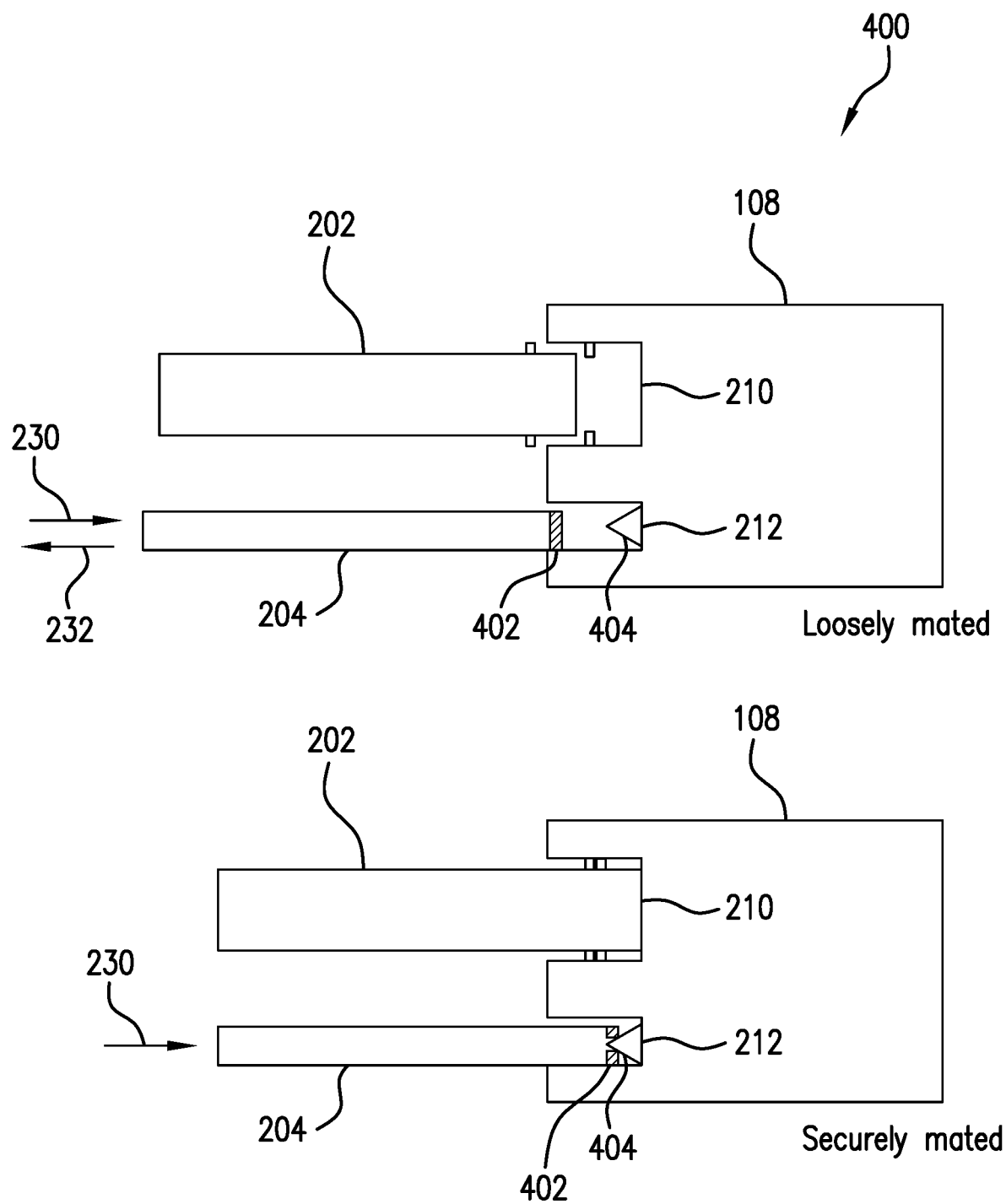
FIG. 4 shows an optical connection system using a frangible reflector to detect an mating state of the optical connection system.

FIG. 4 shows an illustrative optical connection system 400 using a frangible reflector 402 to detect the mating state of the optical connection. When the second optical fiber 204 is in a loosely mated state, a diagnostic signal 230 propagating down the second optical fiber 204 is reflected at the frangible reflector 402 in order to produce a reflected signal 232. The optical interrogator 120 receives the reflected signal 232 to thereby determine that the second optical fiber 204, and hence the first optical fiber 202, is in a loosely mated state.

As the first optical fiber 202 and the first receptacle 210 are moved into a secure mating, the second optical fiber 204 is moved into the second receptacle 212 against a breaking element 404, such as a pin or other obstruction. When the frangible reflector 402 breaks, the diagnostic signal 230 is no longer reflected back through the second optical fiber 204. Therefore, when the first optical fiber 202 changes from a loosely mated state to a securely mated state with the first receptacle 210, the reflected signal of the second optical fiber 204 is lost. The optical interrogator 120 detects the change of the reflected signal 232 from a positively-present signal to a null signal to determine that the first optical fiber 202 is securely mated with the first receptacle 210.

Figure 5:
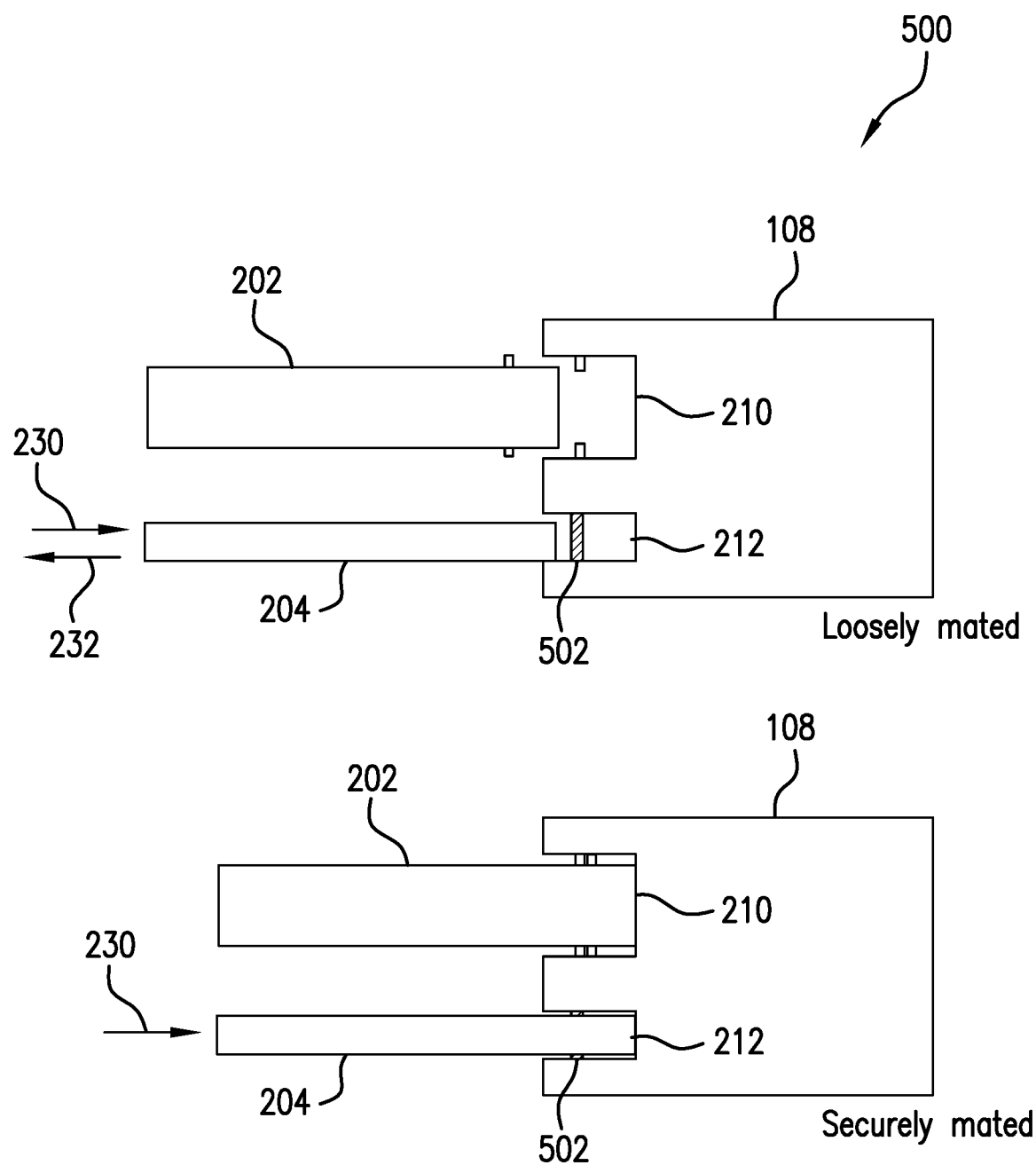
FIG. 5 shows an optical connection system in which a frangible reflector is disposed in a receptacle.

FIG. 5 shows an embodiment of the optical connection system 500 in which a frangible reflector 502 is disposed in the second receptacle 212. The frangible reflector 502 is disposed within the second receptacle 212 at a location such that breaking of the frangible reflector 502 by the second optical fiber 204 coincides with secure mating of the first optical fiber 202 to the first receptacle 210. The change of the reflected signal 232 from a positively-present signal to a null signal indicates that the first optical fiber 202 is securely mated with the first receptacle 210.

Figure 6:
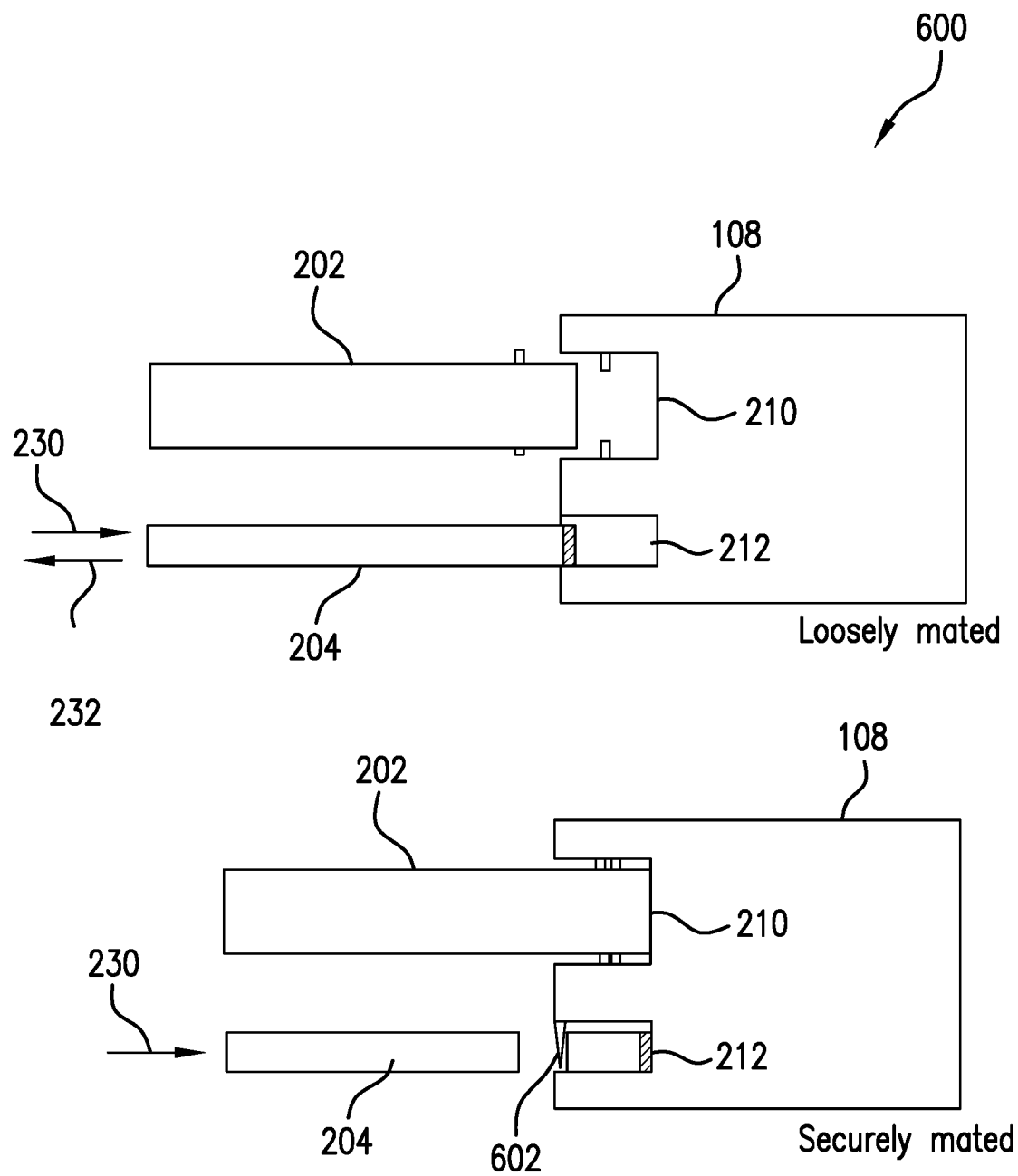
FIG. 6 shows an optical connection system in which a mating state is indicated by severing of an optical fiber.

FIG. 6 shows another embodiment of the optical connection system 500 in which secure mating is indicated by severing of the second optical fiber 204. The second receptacle 212 can include a cutting device 602 that is activated when the second optical fiber 204 enters into the second receptacle 212. The loss of a reflected signal 232 by cutting the second optical fiber 204 can be set to coincide with the first optical fiber 202 being securely mated with the first receptacle 210. Therefore, the processor 124 can determine the mating state of the first optical fiber 202 from the change in state of the diagnostic signal.

Figure 7:
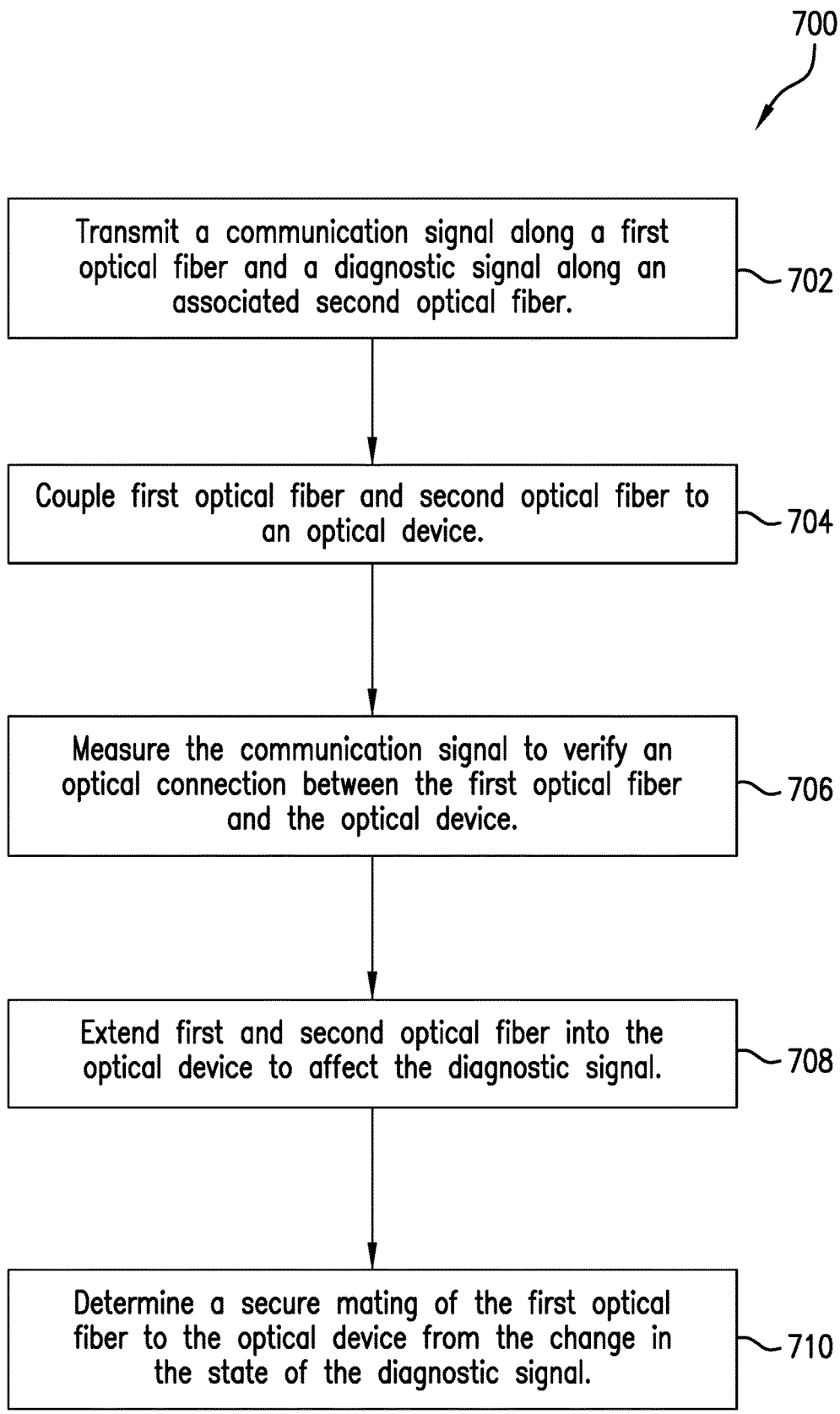
FIG. 7 shows a flowchart illustrating a method of testing a mating state between an optical communication link and an optical device.

FIG. 7 shows a flowchart 700 illustrating a method of testing a mating state between a fiber optic cable and an optical device. In box 702, a communication signal is transmitted along a first optical fiber of the fiber optic cable and a diagnostic signal is transmitted along a second optical fiber of the fiber optic cable. In box 704, the first optical fiber and second optical fiber are mated to an optical device. In box 706, the communication signal is measured to verify an optical connection between the fiber optical fiber and the optical device. In box 708, the fiber optic cable (i.e., the first optical fiber and the second optical fiber) are extended into the optic device in order to secure the mating of the first optical fiber to the optical device, simultaneously affecting the diagnostic signal within the second optical fiber. In box 710, a change in the diagnostic signal is measured in order to determine a secure connection between the optical connection in the first optical fiber and the optical device.

Set forth below are some embodiments of the foregoing disclosure:

Embodiment 1: A method of forming an optical connection with a first optical fiber; propagating a first signal in a first optical fiber of a fiber optic cable and a second signal in a second optical fiber of the fiber optic cable, the second optical fiber including a reflective device, mating the first optical fiber and the second optical fiber to an optical device; observing, at a processor, the first signal to verify an optical connection between the first optical fiber and the optical device, extending the fiber optic cable into the optical device to form a secure mating between the first optical fiber and the optical device, wherein extending the fiber optical cable changes a state of the reflective device of the second optical fiber when the secure mating is formed, and determining, at the processor, the secure mating between the first optical fiber and the optical device from the state of the second signal in the second optical fiber.

Embodiment 2: The method as in any prior embodiment, wherein the second optical fiber runs alongside the first optical fiber.

Embodiment 3: The method as in any prior embodiment, further including mating the first optical fiber to a first receptacle of the optical device and mating the second optical fiber to a second receptacle of the optical device.

Embodiment 4: The method as in any prior embodiment 1, wherein mating the second optical fiber to the optical device breaks a hermetic seal of the optical device.

Embodiment 5: The method as in any prior embodiment, wherein extending the fiber optic cable into the optical device applies a strain to the reflective device of the second optical fiber, the method further including measuring the strain at the reflective device.

Embodiment 6: The method as in any prior embodiment, wherein extending the fiber optic cable into the optical device includes breaking the reflective device of the second optical fiber.

Embodiment 7: The method as in any prior embodiment, wherein extending the fiber optic cable into the optical device includes severing the second optical fiber.

Embodiment 8: A system for optical coupling, including a fiber optic cable including a first optical fiber and a second optical fiber, the second optical fiber including a reflective device, an optical device receptive to the first optical fiber and second optical fiber wherein a loose mating between the first optical fiber and the optical device allows an optical connection for a first signal and a secure mating between the first optical fiber and the optical device coincides with a change in a state of the reflective device, and a processor configured to measure the first signal in the first optical fiber to verify the optical connection between the first optical fiber and the optical device and to measure a state of the second signal in the second optical fiber to measure a state of the second signal in the second optical fiber to determine a security of the mating between the first optical fiber and the optical device.

Embodiment 9: The system as in any prior embodiment, wherein the second signal changes from the first state to the second state when the first optical fiber changes from a loosely mated state to a securely mated state with the optical device.

Embodiment 10: The system as in any prior embodiment, wherein the second optical fiber runs alongside the first optical fiber.

Embodiment 11: The system as in any prior embodiment, wherein the first optical fiber mates to a first receptacle of the optical device and the second optical fiber mates to a second receptacle of the optical device.

Embodiment 12: The system as in any prior embodiment, wherein the optical device includes a hermetic seal breakable by the second optical fiber upon mating of the first optical fiber with the optical device.

Embodiment 13: The system as in any prior embodiment, wherein the reflective device is a strain sensor deformable due to mating of the second optical fiber with the optical device.

Embodiment 14: The system as in any prior embodiment, wherein the reflective device includes a frangible reflector breakable by mating of the second optical fiber with the optical device.

Embodiment 15: The system as in any prior embodiment, wherein the optical device includes a cutting edge that severs the second optical fiber to indicate a secure mating of the first optical fiber to the optical device.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of forming an optical connection with a first optical fiber:
propagating a first signal in a first optical fiber of a fiber optic cable and a second signal in a second optical fiber of the fiber optic cable, the second optical fiber including a reflective device;
mating the first optical fiber and the second optical fiber to an optical device;
observing, at a processor, the first signal to verify an optical connection between the first optical fiber and the optical device;
extending the fiber optic cable into the optical device to form a secure mating between the first optical fiber and the optical device, wherein extending the fiber optical cable changes a state of the reflective device of the second optical fiber when the secure mating is formed; and
determining, at the processor, the secure mating between the first optical fiber and the optical device from the state of the second signal in the second optical fiber.

2. The method of claim 1, wherein the second optical fiber runs alongside the first optical fiber.

3. The method of claim 1, further comprising mating the first optical fiber to a first receptacle of the optical device and mating the second optical fiber to a second receptacle of the optical device.

4. The method of claim 1, wherein mating the second optical fiber to the optical device breaks a hermetic seal of the optical device.

5. The method of claim 1, wherein extending the fiber optic cable into the optical device applies a strain to the reflective device of the second optical fiber, the method further comprising measuring the strain at the reflective device.

6. The method of claim 1, wherein extending the fiber optic cable into the optical device includes breaking the reflective device of the second optical fiber.

7. The method of claim 1, wherein extending the fiber optic cable into the optical device includes severing the second optical fiber.

8. A system for optical coupling, comprising:
a fiber optic cable including a first optical fiber and a second optical fiber, the second optical fiber including a reflective device;
an optical device receptive to the first optical fiber and second optical fiber wherein a loose mating between the first optical fiber and the optical device allows an optical connection for a first signal and a secure mating between the first optical fiber and the optical device coincides with a change in a state of the reflective device; and a processor configured to measure the first signal in the first optical fiber to verify the optical connection between the first optical fiber and the optical device and to measure a state of the second signal in the second optical fiber to measure a state of the second signal in the second optical fiber to determine a security of the mating between the first optical fiber and the optical device.

9. The system of claim 8, wherein the second signal changes from the first state to the second state when the first optical fiber changes from a loosely mated state to a securely mated state with the optical device.

10. The system of claim 8, wherein the second optical fiber runs alongside the first optical fiber.

11. The system of claim 8, wherein the first optical fiber mates to a first receptacle of the optical device and the second optical fiber mates to a second receptacle of the optical device.

12. The system of claim 8, wherein the optical device includes a hermetic seal breakable by the second optical fiber upon mating of the first optical fiber with the optical device.

13. The system of claim 8, wherein the reflective device is a strain sensor deformable due to mating of the second optical fiber with the optical device.

14. The system of claim 8, wherein the reflective device includes a frangible reflector breakable by mating of the second optical fiber with the optical device.

15. The system of claim 8, wherein the optical device includes a cutting edge that severs the second optical fiber to indicate a secure mating of the first optical fiber to the optical device.

* * * * *